United States Patent
Yamashita et al.

(10) Patent No.: US 7,263,254 B2
(45) Date of Patent: Aug. 28, 2007

(54) OPTICAL SWITCH AND CONTROL METHOD THEREFOR

(75) Inventors: Shinji Yamashita, Kawasaki (JP); Tsuyoshi Yamamoto, Kawasaki (JP); Tamotsu Akashi, Kawasaki (JP); Kohei Shibata, Kawasaki (JP); Hirofumi Aota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 56 days.

(21) Appl. No.: 11/148,190

(22) Filed: Jun. 9, 2005

(65) Prior Publication Data
US 2006/0222290 A1    Oct. 5, 2006

(30) Foreign Application Priority Data
Mar. 29, 2005   (JP) ............................. 2005-095965

(51) Int. Cl.
*G02B 6/26*   (2006.01)
(52) U.S. Cl. ........................ 385/18; 385/16; 385/17; 385/22
(58) Field of Classification Search ............ 385/16–18, 385/22
See application file for complete search history.

(56) References Cited
U.S. PATENT DOCUMENTS

| | | | |
|---|---|---|---|
| 6,549,699 B2 | 4/2003 | Belser et al. | 385/24 |
| 6,583,934 B2 | 6/2003 | Kramer | 359/569 |
| 6,750,995 B2 | 6/2004 | Dickson | 359/15 |
| 2002/0109076 A1 | 8/2002 | Tochio et al. | 250/214 |
| 2002/0154855 A1 | 10/2002 | Rose et al. | 385/24 |
| 2004/0207893 A1* | 10/2004 | Miller et al. | 359/212 |

OTHER PUBLICATIONS

K. Sato, et al., "Envisaged IP Over Photonic Networks of the Year 2010(2) Cutting-Edge Technologies on Photonic Backbone Networks", Journal of IEICE, vol. 85, No. 2, pp. 94-103, Feb. 2002.

* cited by examiner

*Primary Examiner*—Jennifer Doan
(74) *Attorney, Agent, or Firm*—Staas & Halsey LLP

(57) ABSTRACT

The present invention provides an optical switch for restricting a reduction in an optical coupling efficiency to an output optical path, which comprises a first spectral unit, a second spectral unit for further spectrally diffracting a plurality of wavelength components spectrally diffracted in the first spectral unit, a plurality of movable mirrors capable of reflecting the plurality of wavelength components spectrally diffracted in the second spectral unit respectively and directing the same in different directions, and a controller for compensating for deviation angles relative to optical axes of the plurality of wavelength components spectrally diffracted in the second spectral unit through setting of angles of reflecting faces in the plurality of movable mirrors.

21 Claims, 11 Drawing Sheets

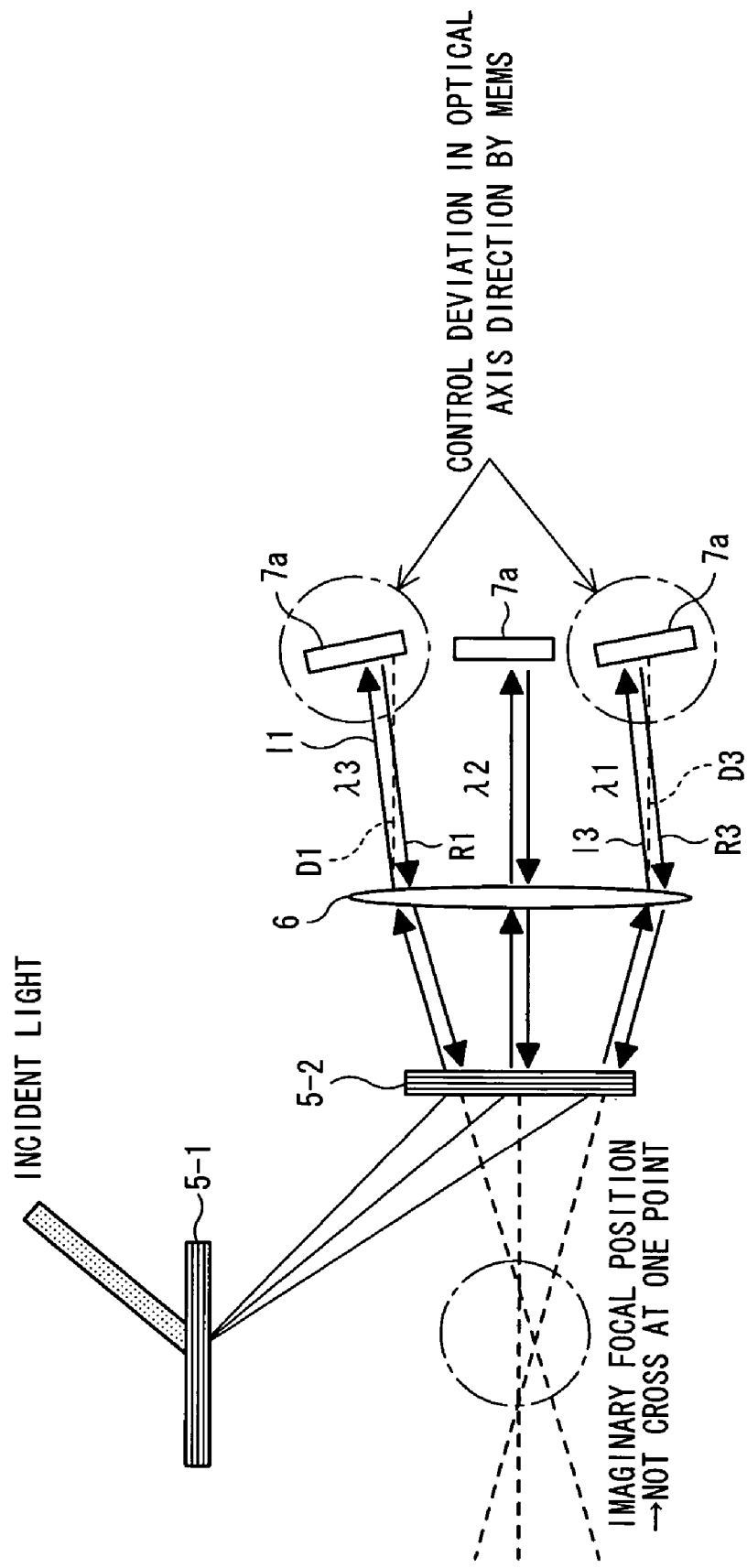

$$f = \frac{p}{\Delta\lambda \cdot d\theta/d\lambda}$$

$\theta = \Delta\lambda \cdot d\theta/d\lambda$ : RESOLVED ANGLE OF WDM LIGHT $\Delta\lambda$ : WAVELENGTH INTERVAL
$d\theta/d\lambda$ : WAVELENGTH RESOLUTION OF SPECTRAL OPTICAL SYSTEM

OPTICAL SWITCH AND CONTROL METHOD THEREFOR

BACKGROUND OF THE INVENTION

1) Field of the Invention

The present invention relates to an optical switch, and particularly to an optical switch suitable for performing path switching for each wavelength component.

2) Description of the Related Art

At present, it is well known that networks centered on wavelength division multiplexing (WDM) have been rapidly made optical in order to accommodate remarkably increasing Internet traffics. Though the present WDM is mainly in the form of point-to-point network, there is considered that the network would be developed to a ring-shaped network or mesh-shaped network in the near future, each node constituting a network could perform processings such as add/drop of arbitrary wavelength and overall optical cross connect (OXC) without conversion into electricity, and setting/releasing of dynamic path based on wavelength information would be performed. The development of photonic network making the most of such optical technique is described in detail in, for example, the journal of IEICE (Institute of Electronics, Information and Communication Engineering) pp. 94-103, 2002-2.

In accordance with the development of the photonic network technique as described above, the development of an optical switch (wavelength selective switch) for performing path switching for each wavelength component is in progress. The wavelength selective switch has a function of classifying an input wavelength to an arbitrary output port, and is arranged at a node in the ring-shaped network or mesh-shaped network as described above to assist realization of a network having a function of setting/releasing a dynamic path based on wavelength information.

FIG. 8 is a diagram showing a conventional optical switch having a wavelength selective switch function. A similar optical switch is disclosed also in the following Patent Reference 1. An optical switch 100 shown in FIG. 8 comprises a collimator 101, a spectral unit 102, a lens 103 and a micromirror array 104. An input optical fiber 105-1 and output optical fibers 105-2 to 105-4 are vertically arranged in the collimator 101.

The collimator 101 outputs a light from the input optical fiber 105-1 as a parallel light to the spectral unit 102, and guides output lights as reflected lights from the spectral unit 102 to the output optical fibers 105-2 to 105-4. The spectral unit 102 is constituted of, for example, a diffraction grating, and is directed for spectrally diffracting a light constituting a wavelength component of the input light from the collimator 101 horizontally in the figure.

FIG. 9 is a diagram showing a sectional structure of a diffraction grating 102A capable of being used as the spectral unit 102. As shown in FIG. 9, the diffraction grating 102A is constituted so that a large number of parallel grooves 102-2 are periodically carved on a glass substrate 102-1. A light LI having a plurality of wavelength components incident at a constant angle α is given an angle β different for each wavelength in an output light LO using a diffraction phenomenon of light. Thus, the wavelength components can be separated.

The lens 103 is directed for focusing each wavelength component light spectrally diffracted in the spectral unit 102, and the micromirror array 104 comprises a plurality of micromirrors 104a which are reflectably arranged at light focusing points of the lens 103 for each wavelength light, respectively. This micromirror array 104 is constituted of MEMS (Micro Electro Mechanical System) mirror array as shown in FIG. 10 and can independently perform switching control of a reflecting angle of the micromirror 104a for reflecting each wavelength component light.

In the optical switch 100 constituted in this manner, a light having several wavelength components input from the input optical fiber 105-1 is spectrally diffracted in the spectral unit 102 and the spectrally-diffracted wavelength component lights are reflected on the corresponding micromirrors 104a. That is, one wavelength of spectrally-diffracted wavelength component light is reflected on the corresponding micromirror 104a.

At this time, switching control is performed on an inclination angle in each micromirror 104a so that the output optical fiber 105-2 to 105-4 as an output destination can be selectively switched for each wavelength component.

For example, when the output destination is the output optical fiber 105-4, as shown in FIG. 11($a$), the inclination angle of the micromirror 104a is set such that a wavelength component light reflected on the micromirror 104a is guided to the output optical fiber 105-4 via a path through the lens 103, the spectral unit 102 and the collimator 101. Similarly, when the output destination is the output optical fiber 105-3, the inclination angle of the micromirror 104a is set as shown in FIG. 11($b$).

Thereby, the output optical fiber 105-2 to 105-4 as the output destination of each wavelength component is set according to the inclination angle of the corresponding micromirror 104a for the wavelength component constituting the input light.

In order to achieve small-sizing of the optical switch 100 having the function described in FIG. 8, it is important to enhance the amount of linear dispersion (capability of decomposing a wavelength or deflecting angle per unit wavelength) of the spectral unit (refer to numeral 102 in FIG. 8) described later. FIG. 12 is a diagram for explaining a relationship between the setting of the amount of linear dispersion and a focal distance of the lens 103.

As shown in FIG. 12, it is assumed that a light decomposed by the amount of linear dispersion defined by a derivative $d\theta/d\lambda$ of an output angle $\theta$ relative to a wavelength $\lambda$ is made to be a parallel light in the lens 103 arranged at an interval of the focal distance "f" from the spectral unit 102 and to be incident into the micromirror array 104. A WDM light where several wavelength components having a wavelength interval $\Delta\lambda$ are multiplexed is spectrally diffracted in the spectral unit 102 to be parallel lights in the lens 103, respectively.

At this time, in order to reflect each wavelength component light as a parallel light at the minimum loss on the micromirror 104a, it is desirable to match the separation of each wavelength component light with a mirror pitch "p" of each micromirror 104a constituting the micromirror array 104. In order to make the separation of the separated parallel light equal to the mirror pitch "p", it is necessary to meet formula (1).

$$p = \Delta\lambda \cdot d\theta/d\lambda \cdot f \tag{1}$$

Here, when the mirror pitch and the wavelength interval $\Delta\lambda$ are set, the focal distance "f" is made smaller to enable an arrangement of an optical system to be compact so that small-sizing of the optical switch can be developed. However, in order to make this focal distance "f" small, when the mirror pitch and the wavelength interval $\Delta\lambda$ are set as described above, it is necessary to make the amount of linear dispersion $d\theta/d\lambda$ larger.

In order to make the amount of linear dispersion larger, it is considered to increase the number of grooves per unit length of the diffraction grating or to user several diffraction gratings.

There will be initially considered the case of increasing the number of grooves per unit length of the diffraction grating. FIG. 13 is a diagram for explaining a relationship between an incident angle into the diffraction grating and the amount of linear dispersion in changing "Nm". Here, "N" indicates the number of grooves and "m" indicates an order of diffraction. When the order of diffraction "m" is assumed to be fixed at "1", the number of grooves "N" is increased so that the amount of linear dispersion can be made larger. But in the typical diffraction grating 102A as shown in FIG. 9, as the number of grooves is increased, reduction in diffraction efficiency, increase in polarization dependent loss (PDL) and the like occur.

Though Patent Reference 2 listed below describes a diffraction grating capable of restricting the reduction in diffraction efficiency even when the number of grooves is increased, since the diffraction grating has a specific structure, manufacturing cost would be higher at present.

There will be next considered the case of using several diffraction gratings. FIG. 14 illustrates a structure of using two diffraction gratings 112-1 and 112-2 to spectrally diffract. In FIG. 14, the two diffraction gratings 112-1 and 112-2 are cascade-arranged on an optical path so that an optical signal spectrally diffracted in the first diffraction grating 112-1 is further transmitted through (or reflected on) the other diffraction grating 112-2, thereby doubling the dispersion capability.

For example, when a wavelength-multiplexed light having wavelength components $\lambda 1$ to $\lambda 3$ is incident at an incident angle $\alpha$ in the first diffraction grating 112-1, the wavelength component lights $\lambda 1$ to $\lambda 3$ are output at angles $\alpha - \Delta\theta$, $\alpha$ and $\alpha + \Delta\theta$ different from each other, and when the wavelength component lights $\lambda 1$ to $\lambda 3$ are incident into the second diffraction grating 112-2 at the incident angles $\alpha - \Delta\theta$, $\alpha$ and $\alpha + \Delta\theta$, the lights are further diffracted and output, respectively. Patent reference 3 also describes a structure where two diffraction gratings are cascade-arranged on an optical path.

The diffraction grating, which has the relatively small amount of linear dispersion, can achieve both relatively high diffraction efficiency and relatively small PDL with relative ease, and can be constituted at low cost. Therefore, the structure having the two diffraction gratings which are cascade-arranged (double monochrome structure) shown in FIG. 9 may be good for constituting the spectral unit meeting the relatively high amount of linear dispersion, the relatively high diffraction efficiency, the relatively small PDL and the relatively low cost without increasing the number of grooves of each diffraction grating.

Additionally, techniques related to the present invention include Patent Reference 4 and Patent Reference 5 below.

(Patent Reference 1) U.S. Pat. No. 6,549,699
(Patent Reference 2) U.S. Pat. No. 6,750,995
(Patent Reference 3) U.S. Patent Application Publication No. 2002/0154855
(Patent Reference 4) U.S. Pat. No. 6,583,934
(Patent Reference 5) U.S. Patent Application Publication No. 2002/0109076

However, in the conventional optical switch 100 as described above, when the spectral unit 102 is constituted so that several diffraction gratings are cascade-arranged, there is a problem that when spectrally-diffracted wavelength components are focused in the lens 103, an angular deviation occurs for the optical axis direction, that is, even when the optical axis of each wavelength component transmits through the lens 103, the wavelength components are difficult to be parallel.

The lights (wavelength component lights) transmitting through the lens 103 are difficult to be parallel because of the following reason. That is, as shown in FIG. 14, since the wavelength component lights $\lambda 1$ to $\lambda 3$ are output in the first diffraction grating 112-1 at the angles $\alpha - \Delta\theta$, $\alpha$ and $\alpha + \Delta\theta$ different from each other, respectively, the lengths of the optical paths op1 to op3 up to being incident into the second diffraction grating 112-2 are different from each other and the incident angles $\alpha - \Delta\theta$, $\alpha$ and $\alpha + \Delta\theta$ into the diffraction grating 112-2 are also different from each other.

In other words, assuming that the light beam of each wavelength component output from the second diffraction grating 112-2 is swept, the light beams do not cross at one point. That is, the imaginary focal position is different, so that even when the light beams are transmitted through the single lens 103 having the focal distance "f", the light beams are difficult to be parallel.

Therefore, when the spectral unit 102 of the optical switch 100 employs the double monochrome structure as shown in FIG. 14, each wavelength component is not perpendicularly incident into the micromirror array 104, thereby deteriorating an efficiency that the reflected lights in the micromirror array 104 are coupled with the output optical fibers 105-2 to 105-4.

Also in the techniques described in Patent references 1 to 5, there is not described a technique for improving a reduction in coupling with an output optical path in the case where several diffraction gratings are cascade-arranged.

SUMMARY OF THE INVENTION

The present invention has been made in terms of the above object, and it is an object thereof to restrict a reduction in coupling with an output optical path.

Therefore, an optical switch according to the present invention comprises a first spectral unit, a second spectral unit for further spectrally diffracting a plurality of wavelength components spectrally diffracted in the first spectral unit, a plurality of movable mirrors capable of reflecting the plurality of wavelength components spectrally diffracted in the second spectral unit respectively and directing the same in different directions, and a controller for compensating for deviation angles relative to optical axes of the plurality of wavelength components spectrally diffracted in the second spectral unit through setting of angles of reflecting faces in the plurality of movable mirrors.

In this case, the plurality of movable mirrors comprise a mechanism for inclining a reflecting face about at least two axes, and the compensating may be performed by controlling the reflecting face about one of the two axes.

Preferably the first and second spectral units are constituted of diffraction gratings, and the compensating is performed by rotatably controlling the plurality of movable mirrors in the same direction as a rotating direction relative to the normal line of the second diffraction grating in paths of the plurality of wavelength components spectrally diffracted in the second spectral unit.

Preferably the compensating is performed by controlling so that a movable mirror for reflecting the longest wavelength and a movable mirror for reflecting the shortest wavelength are rotated in the same direction.

Further, there may be further provided a storage unit for storing control parameters required for the setting to perform the setting according to stored contents of the storage unit.

Further, the optical switch according to the present invention comprises a first spectral unit, a second spectral unit for further spectrally diffracting a plurality of wavelength components spectrally diffracted in the first spectral unit, a plurality of movable mirrors capable of reflecting the plurality of wavelength components spectrally diffracted in the second spectral unit respectively and directing the same in different directions, and a controller for controlling so that, before or after switching an output port by controlling a reflecting face of at least one movable mirror among the plurality of movable mirrors, an inclination of the reflecting face is different for a first axis but an inclination of the reflecting face is the same for a second axis perpendicular to the first axis.

Further, the optical switch according to the present invention comprises a first spectral unit, a second spectral unit for further spectrally diffracting a plurality of wavelength components spectrally diffracted in the first spectral unit, a plurality of movable mirrors capable of reflecting the plurality of wavelength components spectrally diffracted in the second spectral unit respectively and directing the same in different directions, and a controller for setting so that a reflecting face of at least one movable mirror among the plurality of movable mirrors is inclined in an initial state.

The optical switch according to the present invention is constituted so that a plurality of light input/output units arranged in parallel, spectral units, a light focusing unit and movable reflectors are arranged in this order while being optically coupled via reflections by the movable reflectors, and path switching is performed on lights which are input from the light input/output unit for each wavelength component to be output to the light input/output unit, wherein the spectral unit spectrally diffracts a light input from the light input/output unit into a wavelength component light having an angle different for each wavelength through diffraction, the light focusing unit aligns in an optical axis and focuses each wavelength component light spectrally diffracted in the spectral unit, and the movable reflector reflects each wavelength component light from the light focusing unit and sets a first reflecting angle for performing path switching of each wavelength component light while sets a second reflecting angle for correcting a deviation of a reflecting light locus in the movable reflector caused by a deviation of an optical axis of each wavelength component light from the light focusing unit.

In this case, the spectral unit can be composed of a plurality of diffraction gratings cascade-arranged on an optical path. The movable reflector can correct by a reflecting angle a deviation of an optical axis caused by a difference in optical path lengths of each wavelength component light due to the plurality of diffraction gratings cascade-arranged.

Further, the plurality of light input/output units are arranged in parallel in the vertical direction, and the spectral unit can spectrally diffract a light from the light input/output unit into a wavelength component light having an angle different for each wavelength in the horizontal direction relative to the vertical direction. A first reflecting angle set in the movable reflector is an angle for displacing a reflecting optical path corresponding to the vertical direction at which the plurality of light input/output units are arranged in parallel, and a second reflecting angle is an angle for displacing a reflecting optical path in the horizontal direction relative to the vertical direction at which the spectral unit spectrally diffracts. In this case, the movable reflector can be constituted of micromirrors capable of setting the first reflecting angle and the second reflecting angle for each wavelength component light.

Further, preferably there may be provided a controller for performing path switching of each wavelength component light, and controlling the movable reflector in order to correct a deviation of a reflecting optical path due to the movable reflector caused by a deviation of an optical axis for each wavelength component light from the light focusing unit.

The controller can be constituted of a storage unit for storing control information for controlling a reflecting angle to be set by the movable reflector for the wavelength component light, and a drive controller for referring to the control information stored in the storage unit and drive-controlling the movable reflector at the control amount corresponding to the referred control information.

The storage unit can be constituted of a first storage unit for storing first control information for switching the first reflecting angle for performing path switching of each wavelength component light, and a second storage unit for storing second control information for setting the second reflecting angle of each wavelength component light on initiating the optical switch. Further, the drive controller may drive-control the movable reflector in order to perform initial setting on the second reflecting angle of the movable reflector based on the second control information stored in the second storage unit on initiating the optical switch.

There may be stored information for setting a second reflecting angle having the same inclination direction for a wavelength component light which requires correction of a deviation of an optical axis among respective wavelength component lights from the light focusing unit as the second control information stored in the second storage unit.

The optical switch comprises an output light monitor for monitoring an output light output to the light input/output unit so that the drive controller is constituted for feeding back the control amount for the movable reflector based on a monitoring result in the output light monitor.

There is provide a method for controlling an optical switch, the optical switch being constituted so that a plurality of light input/output units arranged in parallel, spectral units, a light focusing unit and movable reflectors are arranged in this order while being optically coupled via reflections by the movable reflectors, and path switching is performed on lights which are input from the light input/output unit for each wavelength component to be output to the light input/output unit, where the spectral unit spectrally diffracts a light input from the light input/output unit into a wavelength component light having an angle different for each wavelength through diffraction, the light focusing unit aligns in an optical axis and focuses each wavelength component light spectrally diffracted in the spectral unit, and the movable reflector reflects each wavelength component light from the light focusing unit and sets a first reflecting angle for performing path switching of each wavelength component light while sets a second reflecting angle for correcting a deviation of a reflecting light locus in the movable reflector caused by a deviation of an optical axis of each wavelength component light from the light focusing unit, and the optical switch comprising a controller for performing path switching of each wavelength component light and controlling the movable reflector in order to correct a deviation of an optical axis for each wavelength component light from the light focusing unit, wherein the controller previously stores initial setting control information for setting the second reflecting angle as an initial setting value of each wavelength component, and performs initial setting of the second reflecting angle of the movable reflector based on the stored initial setting control information on initiating the optical switch.

According to the present invention, there is an advantage that the movable mirrors can restrict the reduction in optical coupling efficiency to the output optical path.

BRIEF DESCRIPTION OF THE DRAWINGS

FIG. 4 is a schematic diagram for explaining that the operation of the MEMS mirror according to the present embodiment deals with a deviation in an optical axis direction;

DESCRIPTION OF THE PREFERRED EMBODIMENTS

An embodiment according to the present invention will be described below with reference to the drawings.

In addition to the above object of the present invention, other technical objects, means for solving the technical objects and operational effects thereof will be apparent from the disclosure of the following embodiment.

[A] Description of One Embodiment

[A1] Structure

Figure 1:
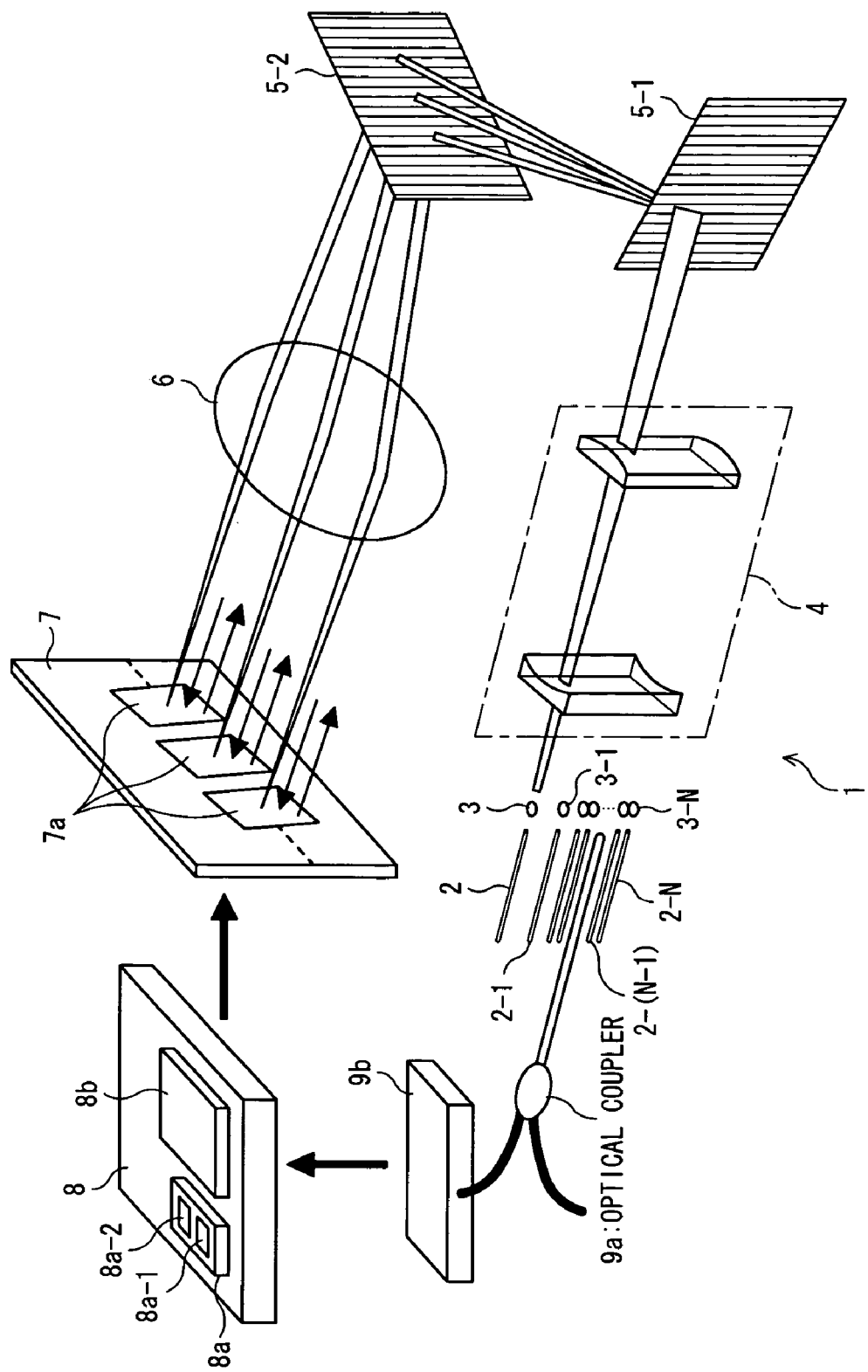
FIG. 1 is a schematic perspective view showing an optical switch according to one embodiment of the present invention.
Figure 8:
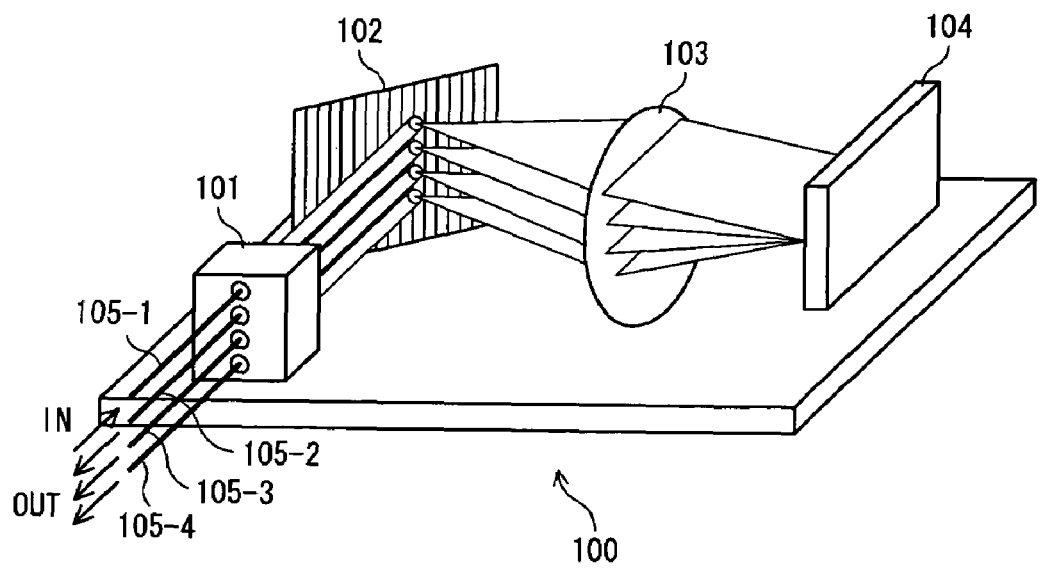
FIG. 8 is a diagram showing a conventional optical switch having a wavelength selective switch function.

FIG. 1 is a schematic perspective view showing an optical switch according to one embodiment of the present invention. The optical switch 1 shown in FIG. 1 has a function of performing path switching for each wavelength component similarly as the optical switch 100 shown in FIG. 8 described above. In the present embodiment, as one example, there are constituted 1×N wavelength selective switches for selectively switching and outputting a light input from an input optical fiber 2 corresponding to an input path to any one of N output optical fibers 2-1 to 2-N corresponding to N (N is plural) output paths for each wavelength component.

The optical switch 1 shown in FIG. 1 comprises collimators 3 and 3-1 to 3-N, a beam expander 4, two diffraction gratings 5-1 and 5-2, a lens 6, a MEMS mirror array 7 having MEMS mirrors 7a, and a controller 8 for controlling the MEMS mirror array 7. Further, the optical switch 1 comprises a coupler 9a and a WDM monitor 9b as a structure for monitoring lights output from the output optical fibers 2-1 to 2-N.

The collimators 3 and 3-1 to 3-N, the beam expander 4, the diffraction gratings 5-1 and 5-2, the lens 6 and the MEMS mirror array 7 are positionally arranged in this order with the position where the optical fibers 2 and 2-1 to 2-N are arranged as a starting point, and they are optically coupled with each other via reflection by the MEMS mirrors 7a. Specifically, a light input from the input optical fiber 2 is subjected to path switching for each wavelength component to be output to the output optical fibers 2-1 to 2-N.

Here, the input optical fiber 2 and the output optical fibers 2-1 to 2-N are vertically arranged in parallel, and the collimators 3 and 3-1 to 3-N as the optical input/output units are vertically arranged in parallel in correspondence to the optical fibers 2 and 2-1 to 2-N arranged in parallel in this manner. The collimator 3 optically coupled to the input optical fiber 2 outputs an input light from the input optical fiber 2 to the beam expander 4 at the rear stage as a parallel light.

The beam expander 4 expands a horizontal beam size of an input light beam from the collimator 3, and reduces a horizontal spot size thereof in a reflecting position in the MEMS mirror array 7 at the rear stage, which is constituted of, for example, a prism or the like. In the MEMS mirror 7a individually provided for reflecting a light for each wavelength, this beam expander 4 restricts a reflection of a wavelength component light having other wavelength, thereby reducing cross talk of the wavelength component light.

The diffraction gratings 5-1 and 5-2 constitute a spectral unit for spectrally diffracting a light input from the collimator 3 via the beam expander 4 into a wavelength component light having an angle different for each wavelength through the diffraction. That is, the diffraction grating 5-1 is a first spectral unit and the diffraction grating 5-2 is a second spectral unit. At this time, a direction in which the wavelength component light is expanded through diffraction is diffracted in the horizontal direction substantially perpendicular to the arrangement direction (vertical direction) of the optical fibers 3 and 3-1 to 3-N described above.

Figure 14:
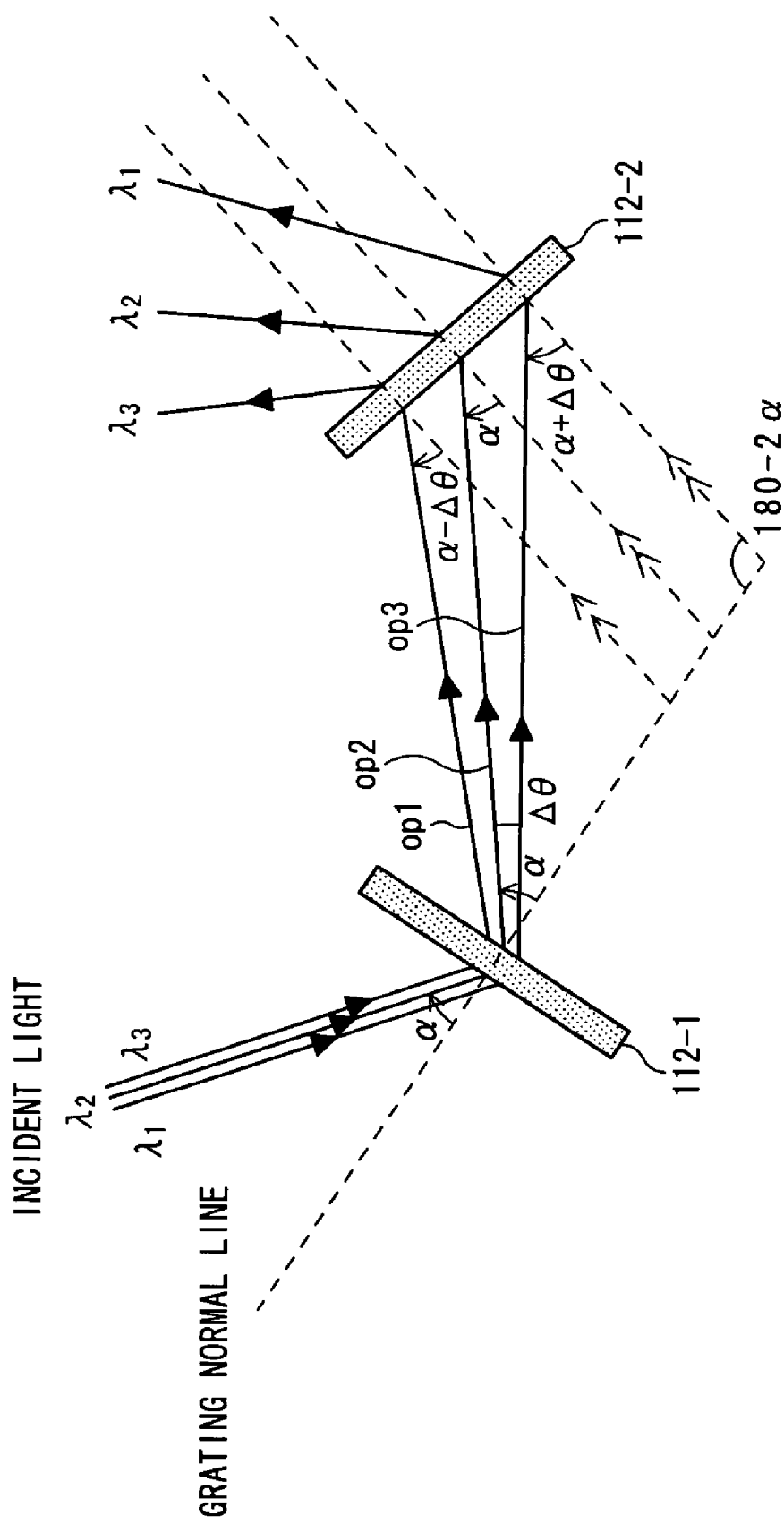
FIG. 14 is a diagram illustrating a structure of spectrally diffracting a light using two diffraction gratings.

These diffraction gratings 5-1 and 5-2 are, similarly as the diffraction gratings 112-1 and 112-2 in FIG. 14, cascade-arranged in an optical path, and an optical signal spectrally diffracted in the first diffraction grating 5-1 is further transmitted through the other diffraction grating 5-2, thereby doubling the dispersion capability. Though the transmission diffraction gratings 5-1 and 5-2 are employed in the present embodiment, the reflective ones may be employed to constitute.

For example, as shown in FIG. 1, when three wavelength component lights λ1 to λ3 spectrally diffracted in the diffraction grating 5-1 are further incident into the diffraction grating 5-2, these three wavelength component lights λ1 to λ3 are output with a difference of added angles, and thus the amount of linear dispersion of the entire diffraction gratings 5-1 and 5-2 is increased.

Furthermore, the lens 6 functions as a light focusing unit for aligning and focusing optical axes of the respective wavelength component lights λ1 to λ3 spectrally diffracted in the diffraction gratings 5-1 and 5-2. The respective wavelength component lights λ1 to λ3 whose optical axes are aligned and focused by being transmitted through the lens 6 are reflected on the different MEMS mirrors 7a, respectively.

Similarly as in the case of FIG. 14, since the respective wavelength component lights λ1 to λ3 are output at mutually different angles in the first diffraction grating 5-1, the optical path lengths up to being incident into the second diffraction grating 5-2 are mutually different between the respective wavelength component lights λ1 to λ3 and the incident angles into the diffraction grating 5-2 are also different from each other, also when the lights are transmitted through the lens 6, the wavelength component lights λ1 to λ3 cause an angular deviation relative to the optical axis direction.

Specifically, when a light beam of each wavelength component output from the second diffraction rating 5-2 is swept, the loci of the respective wavelength component lights do not cross at one point, that is, the imaginary focal positions are different. Thus, even when the lights are transmitted through the lens 6, the respective wavelength component lights λ1 to λ3 cannot have optical axes parallel to each other.

Figure 5:
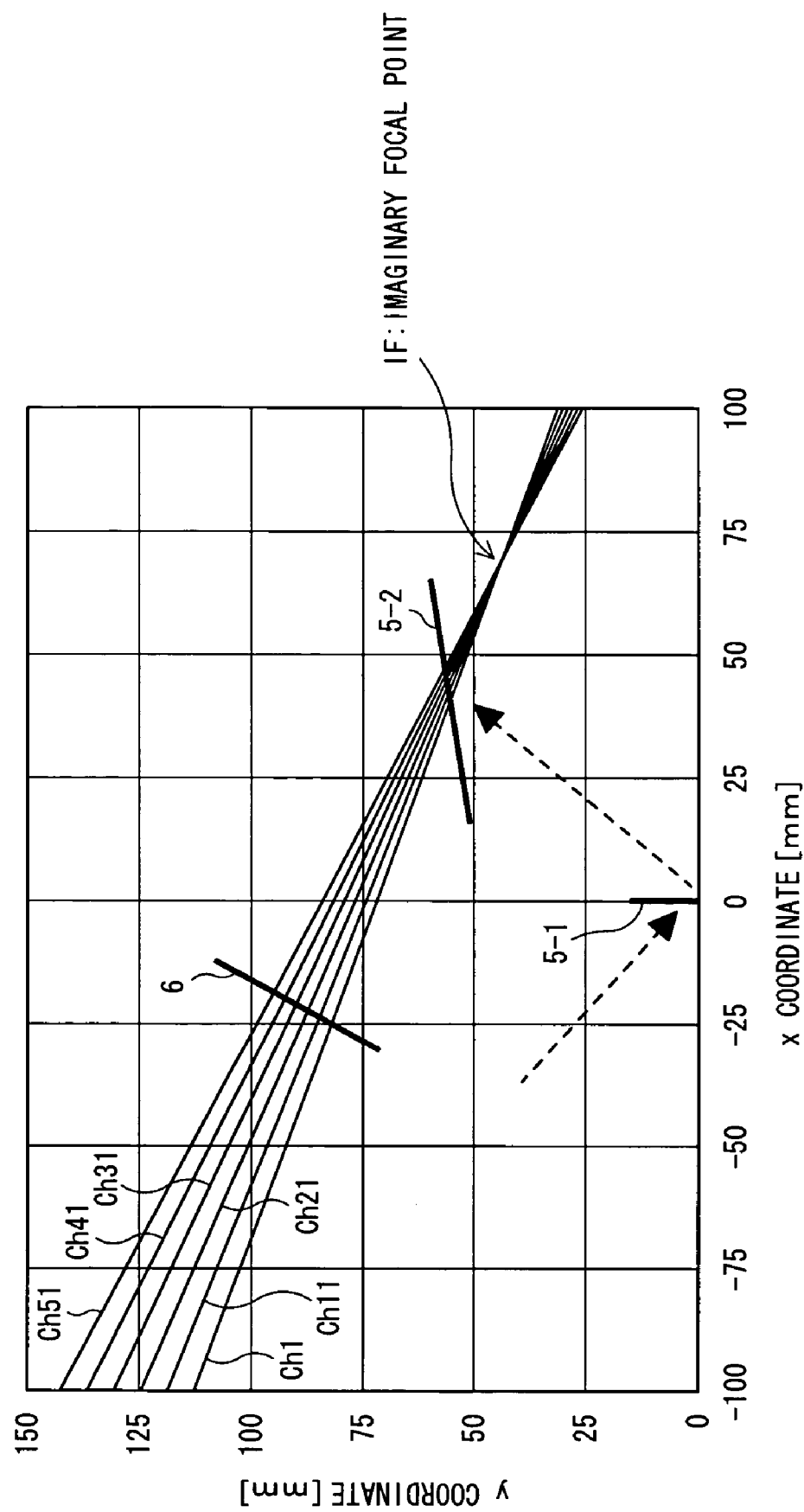
FIGS. 5 to 7 are diagrams for explaining with specific numerical examples that an imaginary focal position is different when an input light is spectrally diffracted in two diffraction gratings.
Figure 6:
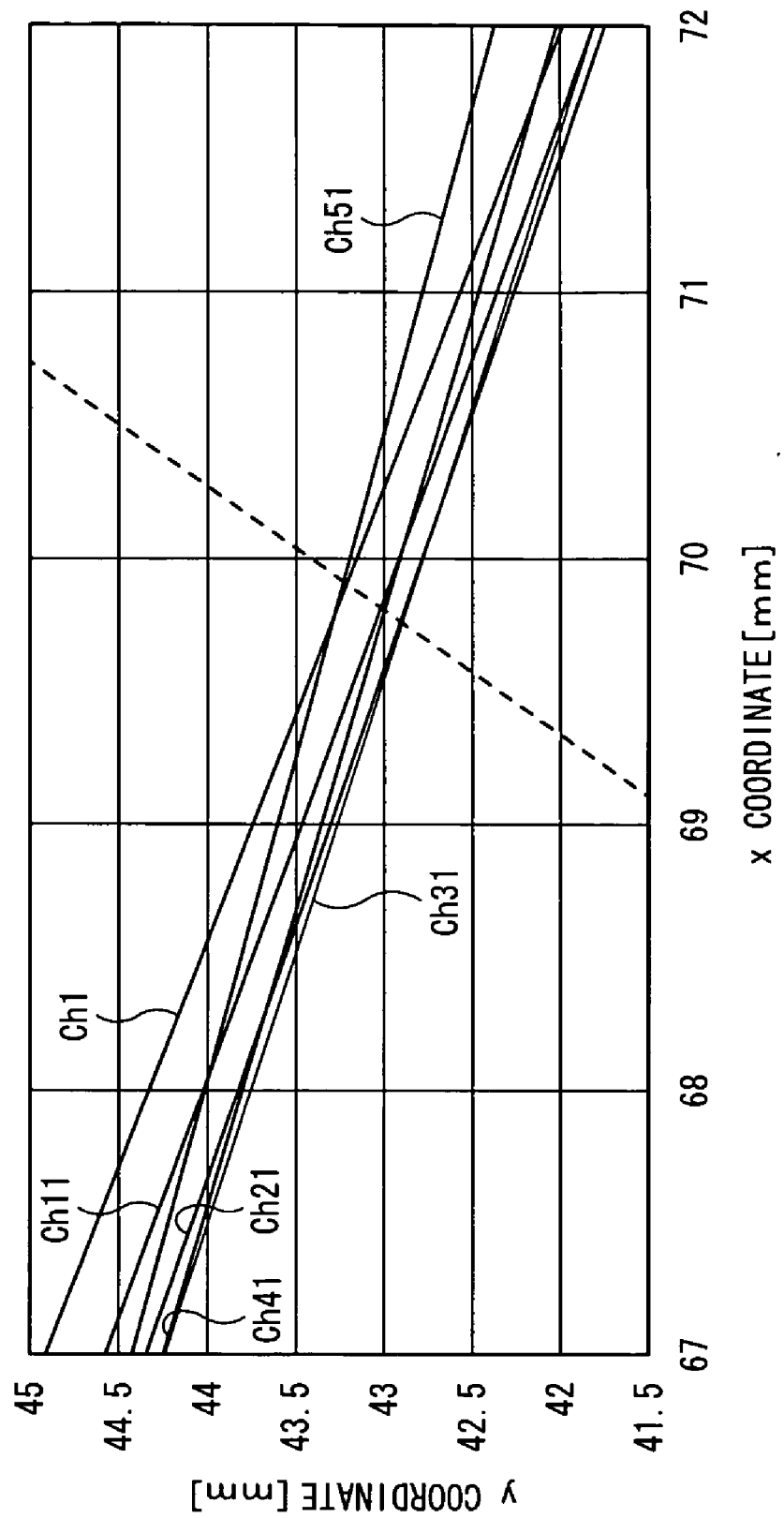
Figure 7:
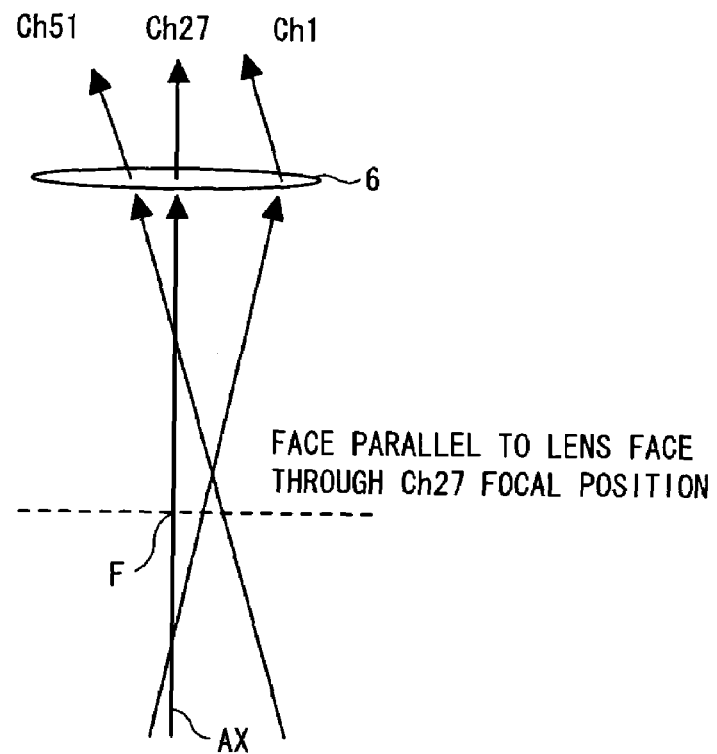

FIGS. 5 to 7 are diagrams for explaining with specific numerical examples that the imaginary focal position is different when an input light is spectrally diffracted in the two diffraction gratings 5-1 and 5-2. Assumptions are as follows: an incident WDM light in each channel has 52 waves from λ=1528.773 nm (channel #1) to 1569.594 nm (channel #52) and a wavelength interval is 100 GHz when the diffraction gratings 5-1 and 5-2 are transmission diffraction gratings having 1000 grooves [grooves/mm], the order of diffraction is primary, an incident angle into the diffraction grating 5-1 is 49.85 degrees, and a distance between the two diffraction gratings is 73.73 mm.

Figure 9:
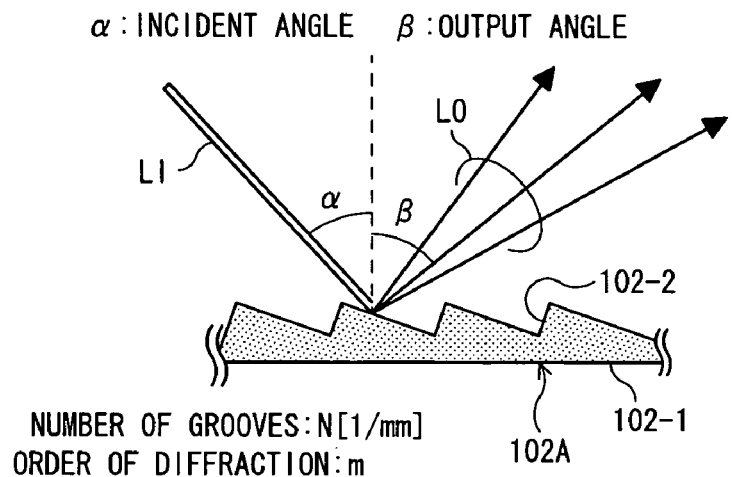
FIG. 9 is a diagram for explaining a function with a sectional structure of the diffraction grating.
Figure 10:
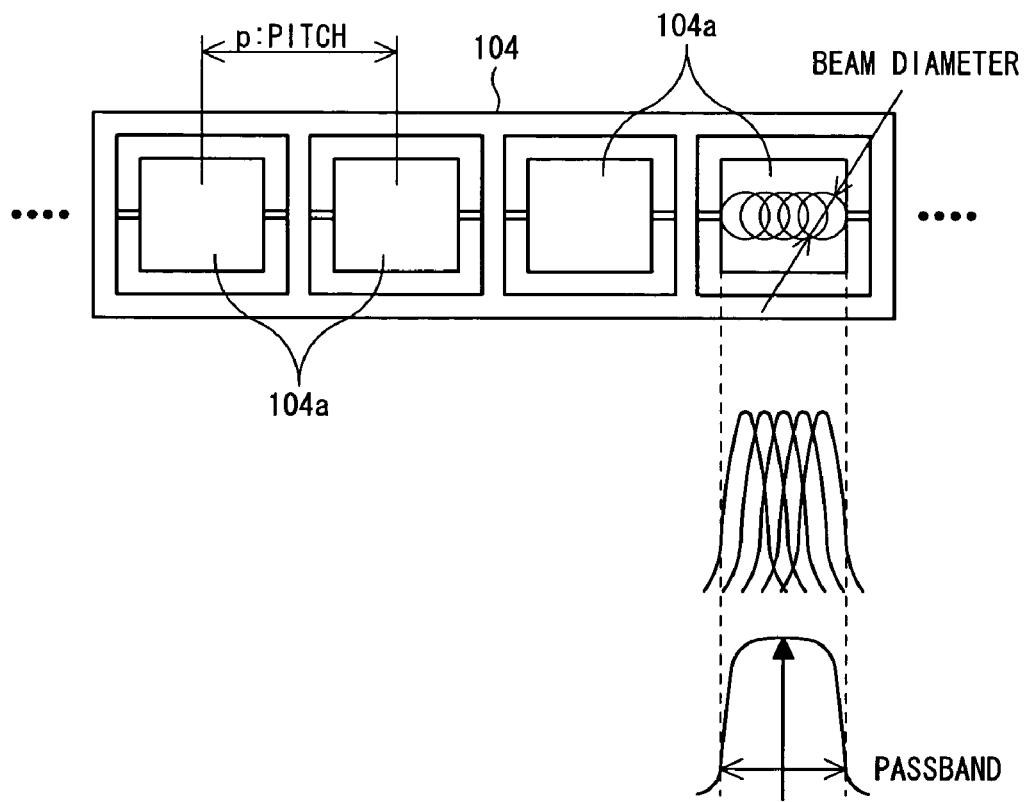
FIG. 10 is a diagram showing the MEMS mirror array.
Figure 11A:
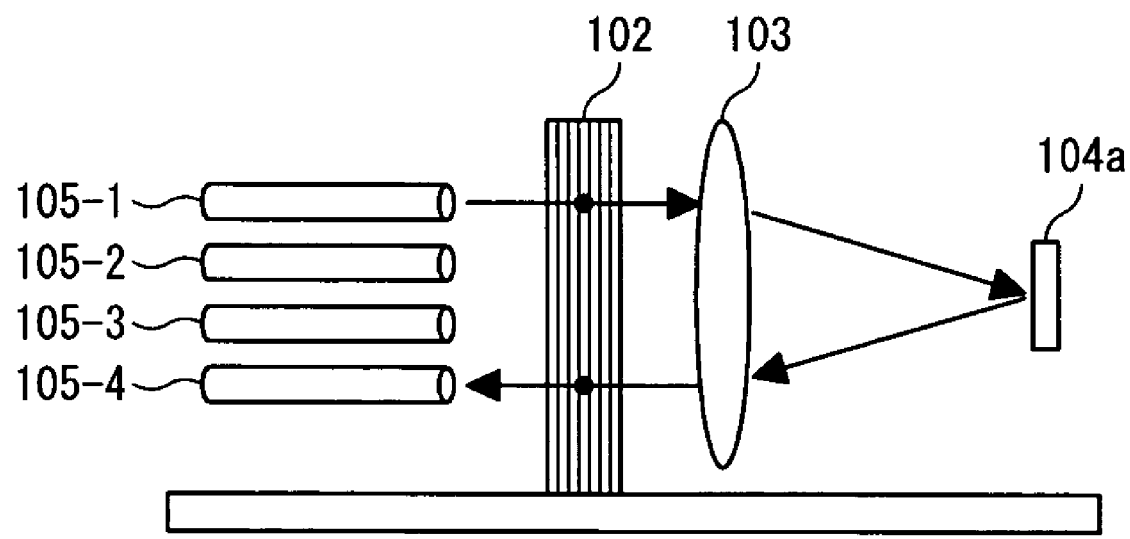
FIGS. 11(a) and 11(b) are diagrams for explaining an operation of the optical switch shown in FIG. 8.
Figure 11B:
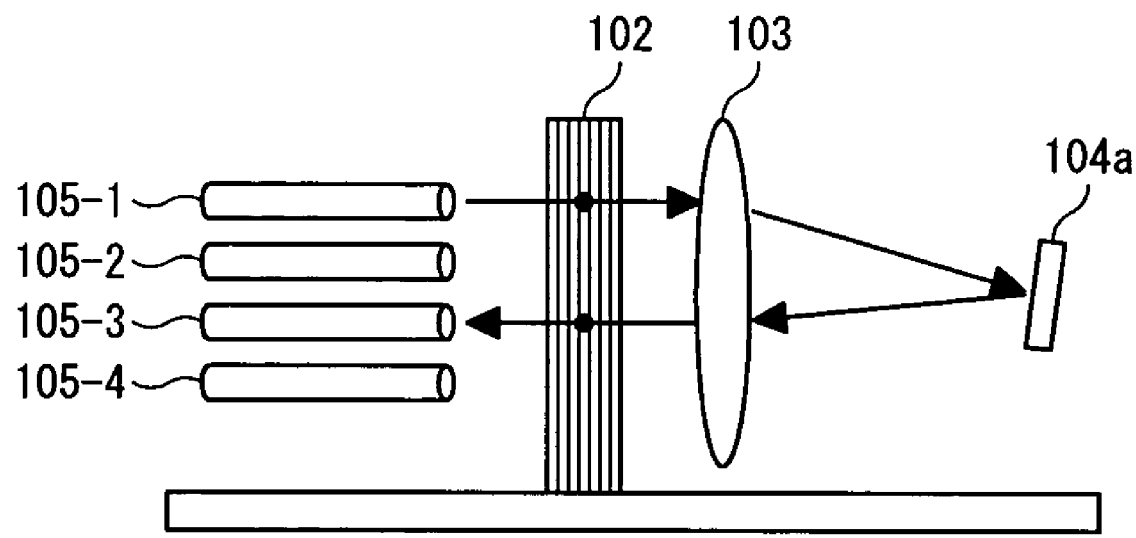
Figure 12:
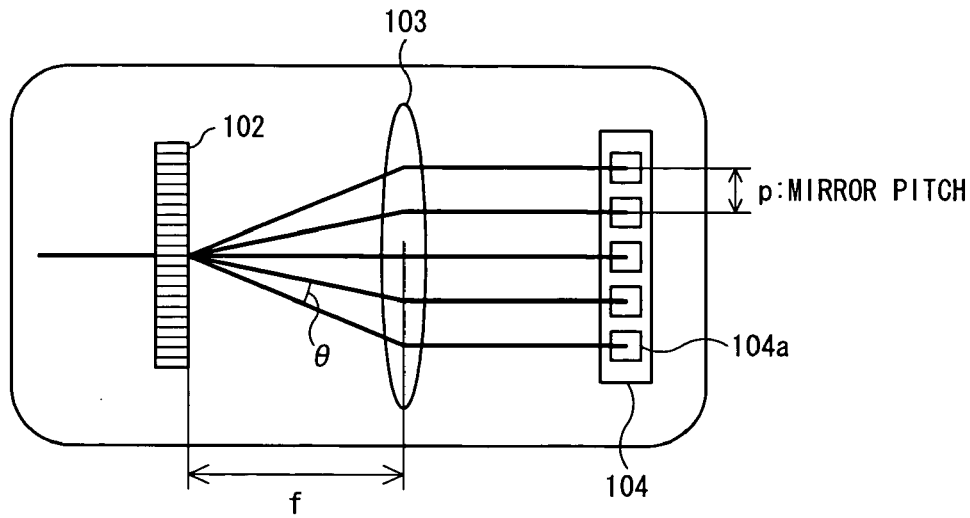
FIG. 12 is a diagram for explaining a relationship between the setting of the amount of linear dispersion and a focal distance of a lens.
Figure 13:
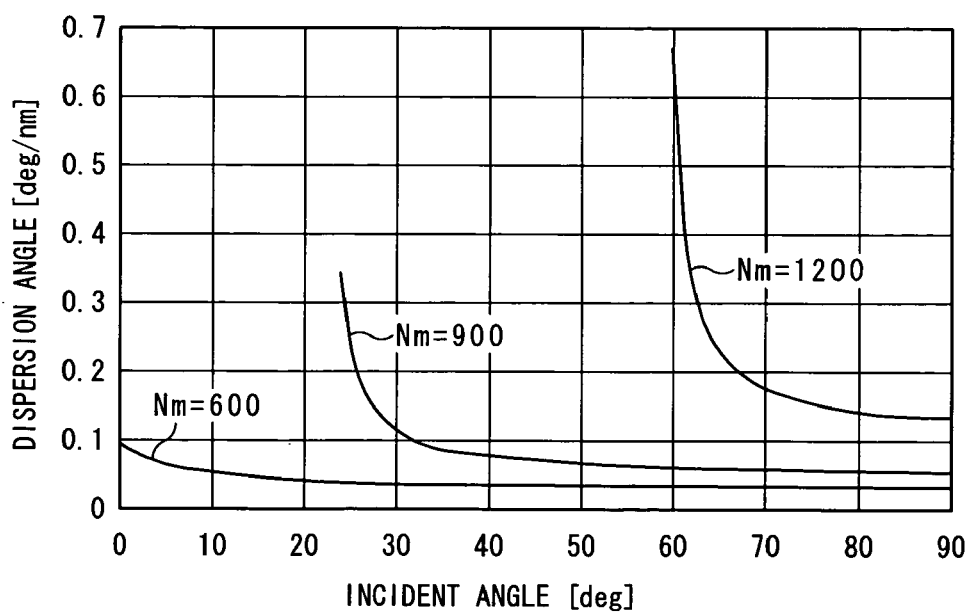
FIG. 13 is a diagram showing a relationship between an incident angle into the diffraction grating and the amount of linear dispersion in changing Nm.

Generally, when an angle (incident angle) formed between the incident light and the normal line of the diffraction grating is α, an angle (diffraction angle) formed between the diffracted light and the normal line of the diffraction grating is β, the number of grooves of the diffraction grating is N [grooves/mm], the order of diffraction is m, and the wavelength is λ (refer to FIG. 9), the following formula (2) is established:

$$\sin \alpha \pm \sin \beta = Nm\lambda \quad (2)$$

FIG. 5 is a graph showing a result obtained by using the above formula (2) to calculate light beams after being output from the second diffraction grating 5-2. In FIG. 5, Ch1, Ch11, Ch21, Ch31, Ch41 and Ch51 indicate the loci when the light beams of the wavelength component lights of the wavelength channels #1, #11, #21, #31, #41 and #51 output from the diffraction grating 5-2 are swept, respectively.

Though it appears that these light beams Ch1, Ch11, Ch21, Ch31, Ch41 and Ch51 are focused substantially at one point as an imaginary focal point IF in FIG. 5, as can be seen from the enlarged diagram around the imaginary focal points IF shown in FIG. 6, the imaginary focal points do not actually cross at one point. This is because one lens 6 cannot make the respective wavelength components Ch1 to Ch52 parallel and a deviation of optical axes occurs. Thus, as described above, since each wavelength component light is not perpendicularly incident into the corresponding MEMS mirror 7a, the reflected lights are deviated from the optical paths guided to the optical fibers 3-1 to 3-N as the output destinations so that input/output optical coupling cannot be obtained.

On the contrary, the MEMS mirror 7a constituting the MEMS mirror array 7 is a movable reflector for individually reflecting a wavelength component light spectrally diffracted in the diffraction grating 5-1 and 5-2. But the respective wavelength component lights are reflected in correspondence to the directions in which the wavelength components are expanded through the diffractions by the diffraction gratings 5-1 and 5-2 in the MEMS mirrors 7a as shown in FIG. 1, thereby obtaining the input/output optical coupling as described above.

Figure 2:
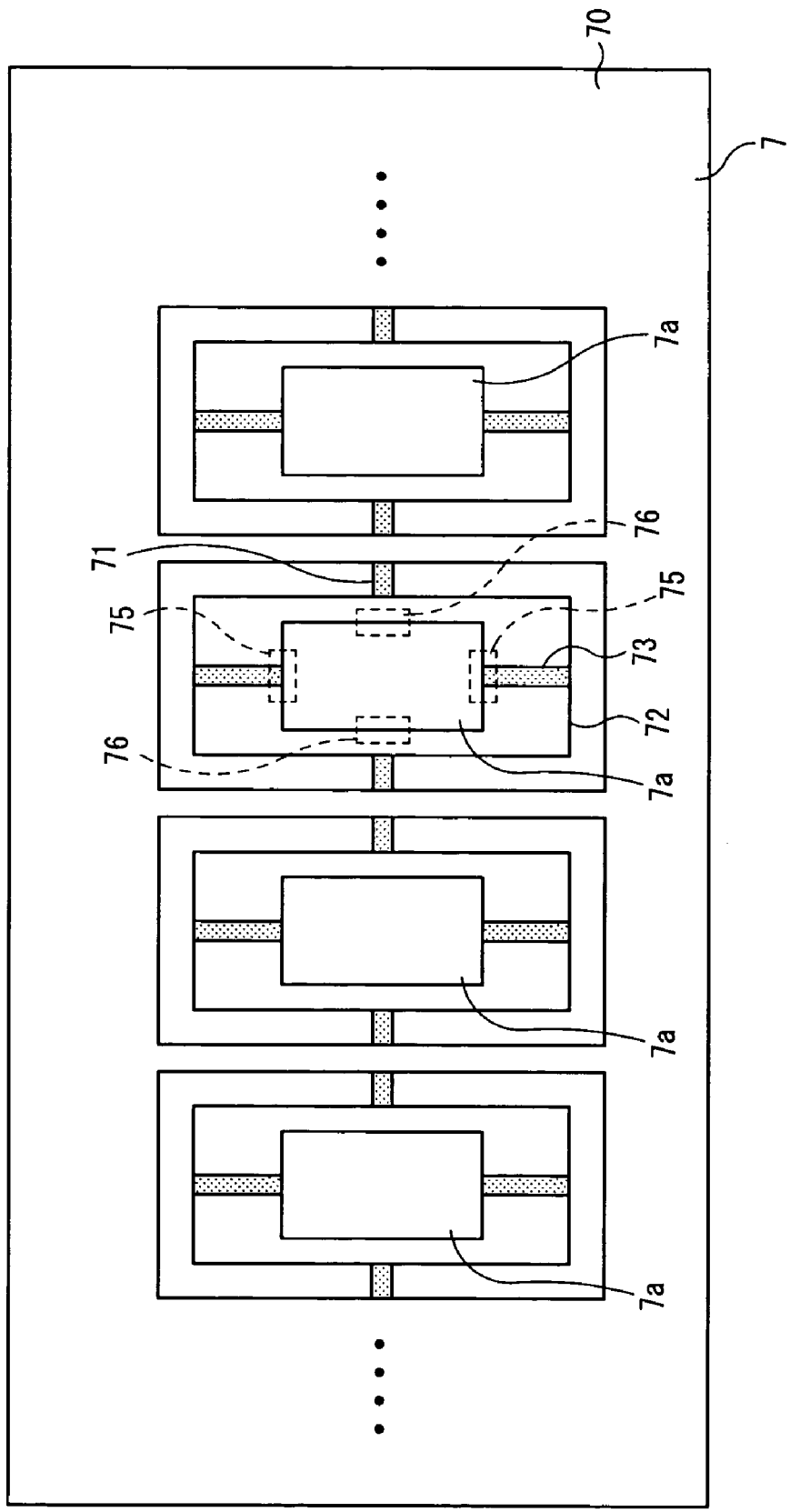
FIG. 2 is a schematic diagram showing a MEMS mirror array according to the present embodiment.

The MEMS mirror 7a in the MEMS mirror array 7 according to the present embodiment is rotatable not only about the horizontal axis but also about the vertical axis as shown in FIG. 2, for example. In order to constitute so that each MEMS mirror 7a is rotatable, the MEMS mirror array 7 comprises a silicon substrate 70, a first torsion bar 71, a frame 72 and a second torsion bar 73.

The first torsion bar 71, which is supported on the silicon substrate 70, is directed for integrally rotating the frame 72, the second torsion bar 73 and the MEMS mirror 7a about the horizontal axis. The frame 72 is directed for connecting the first torsion bar 71 and the second torsion bar 73. The second torsion bar 73, which is supported on the frame 72, is directed for rotating the MEMS mirror 7a about the vertical axis.

Figure 3A:
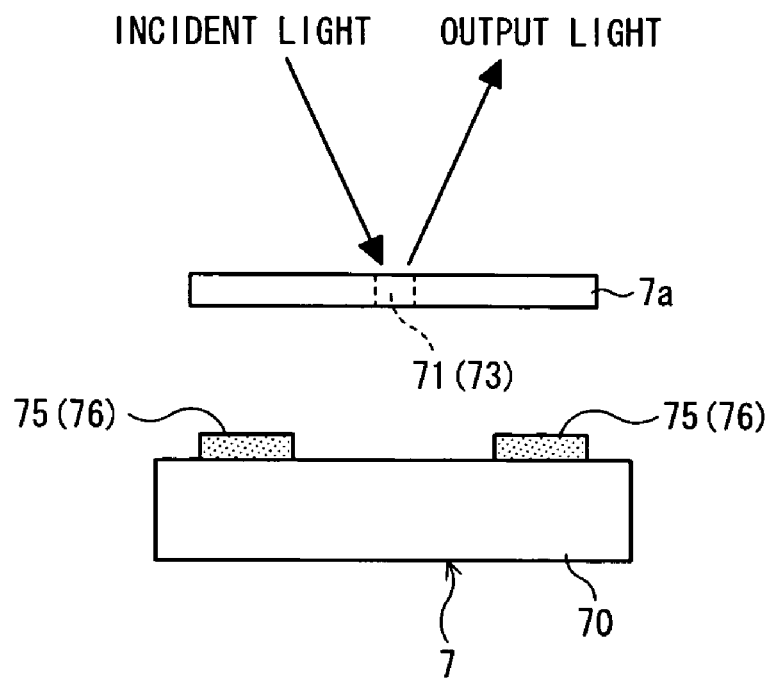
FIGS. 3(a) and 3(b) are schematic diagrams for explaining an operation of the MEMS mirror according to the present embodiment.
Figure 3B:
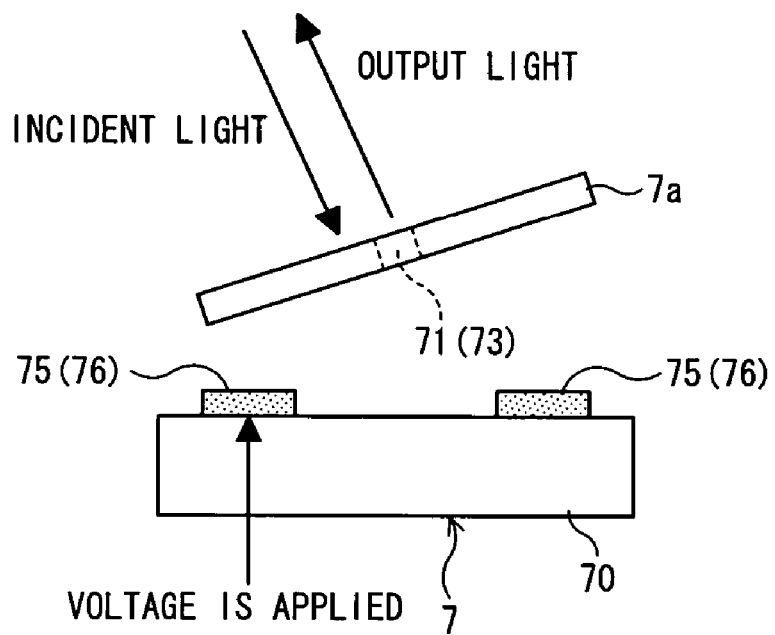

A pair of electrodes 75 is formed on the bottom of the MEMS mirror 7a in order to cause the rotating operation of the MEMS mirror 7a by the first torsion bar 71 as illustrated in FIG. 3(a). That is, a voltage applied to the electrodes 75 gives an electrostatic force to the MEMS mirror 7a, thereby inclining the MEMS mirror 7a relative to the horizontal axis in the figure as illustrated in FIG. 3(b).

Similarly, a pair of electrodes 76 is formed on the bottom of the MEMS mirror 7a in order to cause the rotating operation of the MEMS mirror 7a by the second torsion bar 73. Specifically, a voltage applied to the electrodes 76 gives an electrostatic force to the MEMS mirror 7a, thereby inclining the MEMS mirror 7a relative to the vertical axis in the figure.

As described above, the MEMS mirror 7a is inclined by the voltage applied to the electrodes 75 and 76 so that the angle of the output light can be defined when the wavelength component light transmitted through the lens 6 is assumed as the incident light into the MEMS mirror 7a.

In other words, the output optical fibers 2-1 to 2-N as the output destinations of the wavelength component lights transmitted through the lens 6 are defined by the inclined angle of the MEMS mirror 7a about the horizontal axis by the first torsion bar 71, and the reflecting angle depending on the deviation of the optical axis of each wavelength component light due to being transmitted through the two diffraction gratings 5-1 and 5-2 can be defined by the inclined angle of the MEMS mirror 7a about the vertical axis by the second torsion bar 73.

In other words, the deviation of the optical axis caused by the difference in the optical path length of each wavelength component light due to the two cascade-arranged diffraction gratings 5-1 and 5-2 can be corrected at the reflecting angle of the wavelength component light relative to the MEMS mirror 7a by inclining the MEMS mirror 7a about the vertical axis by the second torsion bar 73.

Though each wavelength component light transmitted through the diffraction gratings 5-1 and 5-2 causes a deviation of the optical axis in the plane including the direction in which the wavelength component light is diffracted, the MEMS mirror 7a deals with the deviation of the optical axis by changing the reflecting angle in the above plane, thereby restricting the reduction in the coupling efficiency to the output optical fibers 2-1 to 2-N as the output destinations.

Specifically, for example as shown in FIG. 4, the MEMS mirror 7a is inclined about the vertical axis by the second torsion bar 73 so that the wavelength component light having the deviation of the optical axis can be an output light which traces the reverse locus corresponding to the locus of the incident light having the deviation of the optical axis.

That is, the wavelength component light λ1 having the deviation D1 of the optical axis can be an output light which traces the reverse locus R1 corresponding to the locus I1 of the incident light by the angle setting of the MEMS mirror 7a for reflection of the wavelength component light λ1 relative to the vertical axis. Similarly, the wavelength component light λ3 having the deviation D3 of the optical axis can be an output light which traces the locus R3 corresponding to the locus I3 of the incident light by the angle setting of the MEMS mirror 7a of the wavelength component light λ3 relative to the vertical axis.

Thus, since the wavelength component light reflected on the MEMS mirror 7a can behave contrary to the wavelength component light before the reflection in the diffraction gratings 5-1 and 5-2, each wavelength component light is guided to the output optical fiber 2-1 to 2-N as the output destinations in the combined 5 state, thereby improving the coupling efficiency of the reflected light to the output optical fibers 2-1 to 2-N.

In other words, the MEMS mirror 7a reflects the wavelength component light from the lens 6 but performs path switching of each wavelength component light, thereby setting the inclination angle about the horizontal axis by the first torsion bar 71 as the first reflecting angle corresponding to the arrangement of the output optical fibers 2-1 to 2-N. Furthermore, the inclination angle about the vertical axis by the second torsion bar 73 can be set as the second reflecting angle corresponding to the diffracting directions in the diffraction gratings 5-1 and 5-2 in order to correct the deviation of the optical axis of the wavelength component light from the lens 6.

The first reflecting angle set in the MEMS mirror 7a is an angle for displacing the reflecting optical path in correspondence to the vertical direction in which the output optical fibers 3-1 to 3-N are arranged in parallel, and the second reflecting angle is an angle for displacing the reflecting optical path in the horizontal direction (corresponding to the above-described vertical direction) in which the diffraction gratings 5-1 and 5-2 spectrally diffract.

The controller 8 is directed for controlling the setting of the first reflecting angle and the second reflecting angle of each MEMS mirror 7a constituting the MEMS mirror array 7. This controller 8 performs path switching of each wavelength component light, and controls the MEMS mirror 7a in order to correct the reflecting optical path caused by the deviation of the optical axis of each wavelength component light incident from the diffraction grating 5-2 via the lens 6 into the MEMS mirror 7a.

The controller 8 comprises a control information storage unit 8a for storing therein control information for controlling the reflecting angle to be set in the MEMS mirror 7a for each wavelength component light, and a drive controller 8b for referring to the control information stored in the control information storage unit 8a to drive-control the MEMS mirror 7a at the control amount corresponding to the referred control information.

Further, the control information storage unit 8a comprises a first storage unit 8a-1 for storing therein first control information for switching the first reflecting angle in order to perform path switching of each wavelength component light, and a second storage unit 8a-2 for storing therein second control information in order to set the second reflecting angle of each wavelength component light on initiating the optical switch 1.

Specifically, on initiating the optical switch 1, the drive controller 8b drive-controls the MEMS mirror 7a by supplying a voltage to the electrodes 76 in order to initially set the second reflecting angle in the MEMS mirror 7a corresponding to each wavelength component light based on the second control information stored in the second storage unit 8a-2.

After the above initiating, based on the path switching instruction for each wavelength component light received from the outside, the first control information for setting the first reflecting angle of each MEMS mirror 7a for performing the path setting according to the instruction is extracted. That is, the drive voltage information for the electrodes 75 for setting the first reflecting angle of each MEMS mirror 7a is extracted for switching into the output optical fiber 3-1 to 3-N for each wavelength component light according to the path setting. Thus, the drive voltage corresponding to the extracted information is supplied to the electrodes 75 to drive-control the MEMS mirror 7a.

In the case shown in FIGS. 5 and 6, when the wavelength component light Ch27 corresponding to the center wavelength channel is assumed as a reference among the wavelength component lights Ch1 to Ch52, deviations of the optical axes occur in the wavelength component lights Ch1 to Ch26 and Ch28 to Ch52.

At this time, as illustrated in FIG. 7, since the wavelength component lights Ch1 to Ch26 shorter than Ch27 transmit through a position distant from the focal position F on the center axis AX of the lens 6 and are incident outward from the center position of the lens 6 (on the right side in the figure), the directions are folded inward (left side) after being transmitted through the lens 6.

Since the wavelength component lights Ch28 to Ch52 longer than Ch27 transmit through a closer position from the focal position F on the center axis AX of the lens 6 and are incident outward from the center position of the lens 6 (on the left side in the figure), the lights are propagated as are directed leftward about the center axis even after transmitting through the lens 6. In FIG. 7, only the beam loci of Ch1, Ch27 and Ch51 are shown.

In this manner, the wavelength component light transmitted through the lens 6 by the diffraction in the diffracting gratings 5-1 and 5-2 in the present embodiment is displaced leftward relative to the center axis AX of the lens 6 irrespective of whether the wavelength is shorter or longer than the wavelength component light Ch27 corresponding to the center wavelength channel. Therefore, in each MEMS mirror 7a for reflecting the wavelength component light of the wavelength channel Ch1 to Ch26 and Ch28 to Ch52, the second reflecting angle rotated leftward at a predetermined amount maybe initially set in correspondence to the light displaced leftward about the center axis of the lens 6.

In other words, in the second storage unit 8a-2, it is possible to store, as the second control information (initial setting control information), information for setting the second reflecting angle having the leftward rotating direction as the same inclination direction for the wavelength component light which requires to correct the deviation of the optical axis among the respective wavelength component lights from the lens 6.

Since the wavelength component light of the wavelength channel Ch27 is not displaced about the center axis of the lens 6, the MEMS mirror 7a for reflecting the wavelength component light of the wavelength channel Ch27 does not require to rotate about the vertical axis unlike the other wavelength channels Ch1 to Ch26 and Ch28 to Ch52.

Specifically, the controller 8 controls such that the inclination of the reflecting face is different about the horizontal axis as the first axis but is the same about the vertical axis as the second axis perpendicular to the horizontal axis before or after switching the output port by controlling the reflecting face of at least one MEMS mirror 7a (in this case, the MEMS mirror 7a of the wavelength channel Ch27) among a plurality of MEMS mirrors 7a (52 mirrors for reflecting Ch1 to Ch52).

The lens 6 is directed for outputting the reflected wavelength component lights reflected on the MEMS mirrors 7a to the diffraction grating 5-2 as the parallel lights, and the diffraction gratings 5-1 and 5-2 are directed for combining the reflected wavelength component lights input via the lens 6 and guiding to the beam expander 4 for each wavelength component light into the output optical fiber 2-1 to 2-N defined as the output destination.

The beam expander 4 is directed for returning the horizontal beam size of the output light from the diffraction grating 5-1 enlarged when the input light transmits to the original size thereof. Furthermore, the collimators 3-1 to 3-N are optically coupled to the output optical fibers 2-1 to 2-N, respectively, and are input the lights combined in the diffraction gratings 5-1 and 5-2 via the beam expander 4 to guide the same to the corresponding output optical fibers 2-1 to 2-N. Thus, the input light from the input optical fiber 2 can be guided to the optical fiber 2-1 to 2-N as the output destination defined for each wavelength component.

Each optical fiber 2-1 to 2-N comprises an optical coupler 9a for branching part of the lights guided as the output lights, and a WDM monitor 9b as an output light monitor for monitoring power of the light branched in each optical coupler 9a for each wavelength component. The monitoring results in this WDM monitor 9b are input as feedback elements to the drive controller 8b so that the voltage for the electrodes 75 and 76 can be controlled to make the monitored optical level maximum.

[A2] Operation Effects

In the optical switch 1 constituted as described above, an input light input through the input optical fiber 2 is spectrally diffracted into wavelength component lights in the diffraction gratings 5-1 and 5-2, which are reflected on the MEMS mirrors 7a individually provided for reflection for each wavelength component lights. At this time, the voltage supplying control for the electrodes 75 (refer to FIG. 2) by the drive controller 8b sets the first reflecting angle to displace the reflecting optical path in correspondence to the vertical direction in which the output optical fibers 2-1 to 2-N are arranged in parallel, while the voltage supplying control for the electrodes 76 sets the second reflecting angle to displace the reflecting optical path in correspondence to the direction in which the diffraction gratings 5-1 and 5-2 spectrally diffract. That is, the second reflecting angle is set, thereby correcting the deviation of the loci of the reflected lights in the MEMS mirrors 7a caused by the deviation of the optical axis of each wavelength component light from the lens 6.

On initiating the optical switch 1, the drive controller 8b in the controller 8 refers to the second storage unit 8a-2 to perform voltage supplying control for the electrodes 76, thereby previously setting the MEMS mirror 7a at the second reflecting angle.

That is, the controller 8 controls the MEMS mirror 7a, thereby setting the MEMS mirror 7a so that the reflecting face of at least one MEMS mirror 7a (in the case shown in FIGS. 5 to 7, MEMS mirror 7a for the wavelength channel Ch1 to Ch26 and Ch28 to Ch52) among a plurality of MEMS mirrors 7a is inclined (at the second reflecting angle).

Thus, also when an input light on which the wavelength switching is to perform for the first time after the optical switch 1 is initiated is input, the reduction in the optical coupling to the output optical fibers 2-1 to 2-N is restricted.

Further, the angular displace (first reflecting angle) of the MEMS mirror 7a for switching the output destination path for each wavelength and the angular displace (second reflecting angle) for correcting the deviation of the locus of the reflected light caused by the deviation of the optical axis are not influenced from each other for the angle setting since they can be controlled independently from each other.

In this manner, according to the optical switch 1 according to one embodiment of the present invention, it is advantageous that while the diffraction gratings 5-1 and 5-2 are cascade-arranged to increase the amount of linear dispersion, the reduction in the optical coupling efficiency to the output optical fibers 2-1 to 2-N as the output optical paths can be restricted by the MEMS mirrors 7a.

[B] Others

The present invention is not limited to the above embodiment and can be variously modified without departing from the spirit of the invention.

For example, though, in the above optical switch 1, the optical fibers 2 and 2-1 to 2-N are vertically arranged in parallel in line and the MEMS mirrors 7a are horizontally arranged in parallel inline, according to the present invention, the optical fibers 2 and 2-1 to 2-N can be vertically arranged in parallel in several lines and the MEMS mirrors 7a can be horizontally arranged in parallel in several lines to integrate 1×N wavelength selective switches.

Though the two diffraction gratings 5-1 and 5-2 are cascade-arranged in the above embodiment, according to the present invention, no less than two diffraction gratings may be cascade-arranged.

Furthermore, when each wavelength component after being wavelength-dispersed is given to the MEMS mirror sequentially through the several diffraction gratings, an angular deviation occurs in the optical axis direction for each wavelength component as described above. An offset angle optimum for each MEMS mirror is desired to set in order to compensate for the deviation amount, and the offset angle is desirably detected as follows.

For example, when the initial setting is performed on startup such as power-ON of the optical switch, the MEMS mirrors arranged in the dispersion direction of the wavelength component are initially controlled to rotate in either direction about the direction perpendicular to the arrangement direction (in this case, may be controlled except for part of channels such as the center wavelength channel Ch27 and adjacent channels thereof) to detect the optimum angle.

The rotating direction is desirably rotated gradually toward the side at which the angular deviation can be compensated for in the optical axis direction for each wavelength component to detect the optimum angle.

As shown in FIG. 14, when a light for the center wavelength Ch27 is incident from rightward relative to the grating normal line, the reflecting face of the MEMS mirror is rotated counterclockwise, and when a light for the center wavelength Ch27 is incident from leftward relative to the grating normal line, the reflecting face is rotated clockwise.

In other words, when the dispersed light from the diffraction grating 112-2 at the last stage is directed in a direction in which the grating normal line is rotated clockwise, the MEMS mirror is also rotated clockwise, and when the dispersed light from the diffraction grating 112-2 at the last stage is directed in a direction in which the grating normal line is rotated counterclockwise, the MEMS mirror is also rotated counterclockwise.

In order to detect whether an angle is optimum, for example, a light including at least a wavelength component reflected by the MEMS mirror where the optimum angle of the reflecting face is desired to detect is input from one input fiber, and power of the output light input into either one output fiber is monitored to store the angle of the MEMS mirror (control voltage) when obtaining the maximum power.

This is performed for all the MEMS mirrors to be adjusted.

It is possible to manufacture the apparatus according to the present invention from the disclosure of the above embodiment.

What is claimed is:

1. An optical switch comprising:
a first spectral unit;
a second spectral unit further spectrally diffracting a plurality of wavelength components spectrally diffracted in the first spectral unit;
a plurality of movable mirrors capable of reflecting the plurality of wavelength components spectrally diffracted in the second spectral unit respectively and directing the same in different directions; and
a controller compensating for deviation angles relative to optical axes of the plurality of wavelength components spectrally diffracted in the second spectral unit through setting of angles of reflecting faces in the plurality of movable mirrors.

2. An optical switch according to claim 1, wherein
the plurality of movable mirrors comprise a mechanism for inclining a reflecting face about at least two axes, and
the compensating is performed by controlling the reflecting face about one of the two axes.

3. An optical switch according to claim 1, wherein
the first and second spectral units are constituted of diffraction gratings, and
the compensating is performed by rotatably controlling the plurality of movable mirrors in the same direction as a rotating direction relative to the normal line of the second diffraction grating in paths of the plurality of wavelength components spectrally diffracted in the second spectral unit.

4. An optical switch according to claim 1, wherein
the compensating is performed by controlling so that a movable mirror reflecting the longest wavelength and a movable mirror reflecting the shortest wavelength are rotated in the same direction.

5. An optical switch according to claim 1, further comprising a storage unit storing control parameters required for the setting, the optical switch performing the setting according to stored contents of the storage unit.

6. An optical switch comprising:
a first spectral unit;
a second spectral unit further spectrally diffracting a plurality of wavelength components spectrally diffracted in the first spectral unit;
a plurality of movable mirrors capable of reflecting the plurality of wavelength components spectrally diffracted in the second spectral unit respectively and directing the same in different directions; and
a controller controlling so that, before or after switching an output port by controlling a reflecting face of at least one movable mirror among the plurality of movable mirrors, an inclination of the reflecting face is different for a first axis but an inclination of the reflecting face is the same for a second axis perpendicular to the first axis.

7. An optical switch comprising:
a first spectral unit;
a second spectral unit for further spectrally diffracting a plurality of wavelength components spectrally diffracted in the first spectral unit;
a plurality of movable mirrors capable of reflecting the plurality of wavelength components spectrally diffracted in the second spectral unit respectively and directing the same in different directions; and
a controller adapted to set a reflecting face of at least one movable mirror among the plurality of movable mirrors to be inclined in an initial state so that deviation angles relative to optical axes of the plurality of wavelength components are compensated for.

8. An optical switch where a plurality of light input/output units arranged in parallel, spectral units, a light focusing unit and movable reflectors are arranged in this order while being optically coupled via reflections by the movable reflectors, and path switching is performed on lights which are input from the light input/output unit for each wavelength component to be output to the light input/output unit, wherein
the spectral unit spectrally diffracts a light input from the light input/output unit into a wavelength component light having an angle different for each wavelength through diffraction,
the light focusing unit aligns in an optical axis and focuses each wavelength component light spectrally diffracted in the spectral unit, and
the movable reflector reflects each wavelength component light from the light focusing unit and sets a first reflecting angle for performing path switching of each wavelength component light while sets a second reflecting angle for correcting a deviation of a reflecting light locus in the movable reflector caused by a deviation of an optical axis of each wavelength component light from the light focusing unit.

9. An optical switch according to claim 8, wherein
the spectral unit is composed of a plurality of diffraction gratings cascade-arranged on an optical path.

10. An optical switch according to claim 9, wherein
the movable reflector corrects by a reflecting angle α deviation of an optical axis caused by a difference in optical path lengths of each wavelength component light due to the plurality of diffraction gratings cascade-arranged.

11. An optical switch according to claim 8, wherein
the plurality of light input/output units are arranged in parallel in the vertical direction, and the spectral unit spectrally diffracts a light from the light input/output unit into a wavelength component light having an angle different for each wavelength in the horizontal direction relative to the vertical direction.

12. An optical switch according to claim 11, wherein
the first reflecting angle set in the movable reflector is an angle for displacing a reflecting optical path corresponding to the vertical direction at which the plurality of light input/output units are arranged in parallel, and the second reflecting angle is an angle for displacing a reflecting optical path in the horizontal direction relative to the vertical direction at which the spectral unit spectrally diffracts.

13. An optical switch according to claim 12, wherein the movable reflector is constituted of micromirrors capable of setting the first reflecting angle and the second reflecting angle for each wavelength component light.

14. An optical switch according to claim 8, comprising a controller performing path switching of each wavelength component light, and controlling the movable reflector in order to correct a deviation of a reflecting optical path due to the movable reflector caused by a deviation of an optical axis for each wavelength component light from the light focusing unit.

15. An optical switch according to claim 14, wherein the controller is constituted of:
    a storage unit storing control information controlling a reflecting angle to be set by the movable reflector for the wavelength component light; and
    a drive controller referring to the control information stored in the storage unit and drive-controlling the movable reflector at the control amount corresponding to the referred control information.

16. An optical switch according to claim 15, wherein the storage unit is constituted of:
    a first storage unit storing first control information switching the first reflecting angle for performing path switching of each wavelength component light; and
    a second storage unit storing second control information setting the second reflecting angle of each wavelength component light on initiating the optical switch.

17. An optical switch according to claim 16, wherein the drive controller drive-controls the movable reflector in order to perform initial setting on the second reflecting angle of the movable reflector based on the second control information stored in the second storage unit on initiating the optical switch.

18. An optical switch according to claim 16, wherein the second storage unit stores, as the second control information, information for setting a second reflecting angle having the same inclination direction for a wavelength component light which requires correction of a deviation of an optical axis among respective wavelength component lights from the light focusing unit.

19. An optical switch according to claim 15, comprising:
    an output light monitor monitoring an output light output to the light input/output unit, wherein
    the drive controller is constituted for feeding back the control amount for the movable reflector based on a monitoring result in the output light monitor.

20. A method for controlling an optical switch, the optical switch is constituted so that a plurality of light input/output units arranged in parallel, spectral units, a light focusing unit and movable reflectors are arranged in this order while being optically coupled via reflections by the movable reflectors, and path switching is performed on lights which are input from the light input/output unit for each wavelength component to be output to the light input/output unit, where the spectral unit spectrally diffracts a light input from the light input/output unit into a wavelength component light having an angle different for each wavelength through diffraction, the light focusing unit aligns in an optical axis and focuses each wavelength component light spectrally diffracted in the spectral unit, and the movable reflector reflects each wavelength component light from the light focusing unit and sets a first reflecting angle for performing path switching of each wavelength component light while sets a second reflecting angle for correcting a deviation of a reflecting light locus in the movable reflector caused by a deviation of an optical axis of each wavelength component light from the light focusing unit, and the optical switch comprising a controller for performing path switching of each wavelength component light and controlling the movable reflector in order to correct a deviation of an optical axis for each wavelength component light from the light focusing unit, wherein
    the controller previously stores initial setting control information setting the second reflecting angle as an initial setting value of each wavelength component, and performs initial setting of the second reflecting angle of the movable reflector based on the stored initial setting control information on initiating the optical switch.

21. A method of controlling an optical switch having a first spectral unit and a second spectral unit, the method comprising:
    diffracting a plurality of wavelength components with the second spectral unit that were first diffracted in the first spectral unit;
    reflecting the plurality of wavelength components spectrally diffracted in the second spectral unit and directing the same in different directions; and
    compensating for deviation angles relative to optical axes of the plurality of wavelength components spectrally diffracted in the second spectral unit through setting of angles of reflecting.

* * * * *

UNITED STATES PATENT AND TRADEMARK OFFICE
CERTIFICATE OF CORRECTION

PATENT NO. : 7,263,254 B2
APPLICATION NO. : 11/148190
DATED : August 28, 2007
INVENTOR(S) : Shinji Yamashita et al.

It is certified that error appears in the above-identified patent and that said Letters Patent is hereby corrected as shown below:

Col. 16, line 48, after "angle" delete "á" and insert --a--, therefor.

Col. 18, line 26, delete "selling" and insert --setting--, therefor.

Col. 18, line 28, delete "selling" and insert --setting--, therefor.

Col. 18, line 29, delete "selling" and insert --setting--, therefor.

Col. 18, line 30, delete "selling" and insert --setting--, therefor.

Signed and Sealed this

Fourth Day of March, 2008

JON W. DUDAS
*Director of the United States Patent and Trademark Office*